(No Model.)
H. A. T. REINECKE.
STEM WINDING AND SETTING ATTACHMENT FOR WATCHES.
No. 310,865. Patented Jan. 13, 1885.
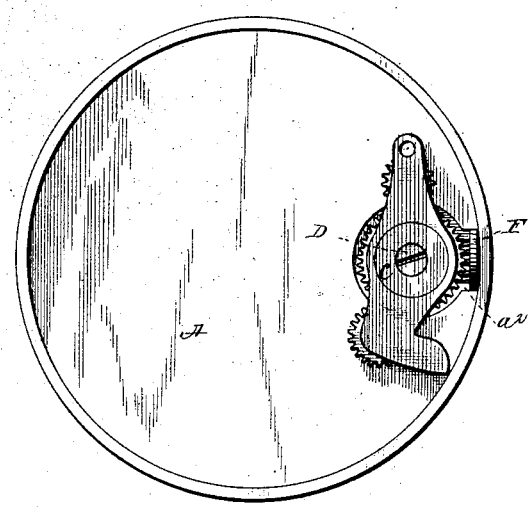
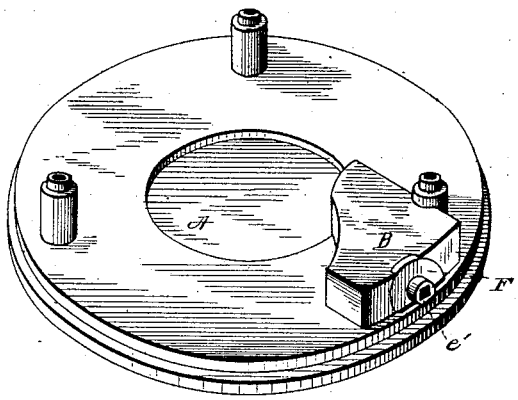
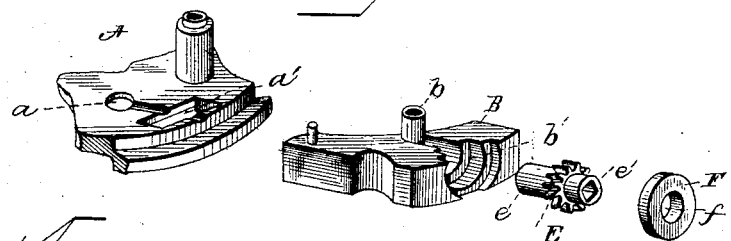
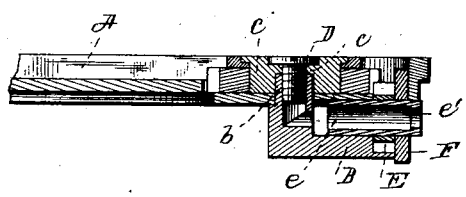
Witnesses.
G. S. Elliott
E. W. Hazard.
Inventor.
H. A. T. Reinecke, by
Pindle & Russell, his Attys

UNITED STATES PATENT OFFICE.

HERMAN A. T. REINECKE, OF THOMASTON, CONNECTICUT.

STEM WINDING AND SETTING ATTACHMENT FOR WATCHES.

SPECIFICATION forming part of Letters Patent No. 310,865, dated January 13, 1885.

Application filed August 22, 1884. (No model.)

*To all whom it may concern:*

Be it known that I, HERMAN A. T. REINECKE, of Thomaston, in the county of Litchfield, and in the State of Connecticut, have invented certain new Improvements in Stem Winding and Setting Attachments for Watches; and I do hereby declare that the following is a full, clear, and exact description thereof, reference being had to the accompanying drawings, in which—

Figure 1 is a plan view of a watch-plate having my improvements attached thereto. Fig. 2 is a perspective view of the lower side of the same. Fig. 3 is a like view, from the inner side, of the bridge for journaling the winding-pinion, the engaging-face of the pillar-plate, the winding-pinion and the collar-bearing separated from each other; and Fig. 4 is an enlarged section of the same when united.

Letters of like name and kind refer to like parts in each of the figures.

The design of my invention is to simplify the construction, to lessen the expense, and to increase the efficiency of watch-movements; to which end said invention consists, principally, as an improvement in stem winding and setting attachments for watches, in a collar which is adapted to receive and form a bearing for the outer end of a winding-pinion, and is locked in place by engagement with the adjacent parts, substantially as and for the purpose hereinafter specified.

It consists, further, in a collar which forms a bearing for the outer end of a winding-pinion, and is locked in place by engagement with a recess that is formed in one of the movement-plates, substantially as and for the purpose hereinafter shown.

It consists, further, in combining with a winding-pinion a bridge which is adapted to receive the same and to journal its inner end, and is secured to or upon one of the movement-plates, and a collar that operates to journal the outer end of said pinion, substantially as and for the purpose hereinafter set forth.

It consists, finally, in a watch-movement in which are combined the following elements, to wit: a winding-bridge, which is held in position upon the pillar-plate by a single screw, a winding-pinion having its inner end journaled within said bridge, and a collar that operates to journal the outer end of said pinion, and is contained within a recess which is partly formed in said bridge and in part within said pillar-plate, substantially as and for the purpose hereinafter shown and described.

In the annexed drawings, A represents the pillar-plate of a watch, upon the lower or inner face of which is secured a bridge, B, that has the form shown in Figs. 2 and 3. Upon the inner face of said bridge is provided a stud, $b$, which projects through a corresponding opening, $a$, in said plate, and furnishes a bearing for, and upon which is pivoted, a yoke, C. A screw, D, passing through said yoke, or through a collar, $c$, that is contained in a recess in the same, into said stud, operates to lock said bridge firmly in place upon said plate.

Within the bridge B is formed a recess, $b'$, which receives a winding-pinion, E, and its inner bearing end, $e$, while within the pillar-plate A is provided an opening, $a'$, through which said pinion projects for engagement with one of the wheels of the winding-train.

Within the outer end of the bridge the recess $b'$ is enlarged, and, in connection with a recess, $a'$, in the adjacent face of the plate A, receives and contains a circular collar, F, which has at its center an axial opening, $f$, that fits over the outer end, $e'$, of the winding-pinion E, and furnishes a bearing for the same. The collar F is preferably constructed from steel, but may be made from any other suitable material, if desired. It is held firmly in place radially by peripheral contact with the inner peripheries of the recesses $b'$ and $a'$, and is prevented from motion in a line with the axis of the winding-pinion E by the engagement of its edge with the sides of said recess $a'$. Said collar is inserted in said recess $b'$, and over said pinion-journal $e'$, before said bridge is placed in position upon said plate, and can only be removed after said bridge has been detached.

While the collar F is preferably held in place as shown, it may be arranged to engage at its edges with either or both of the movement-plates, or may be locked in position by any other means.

Having thus fully set forth the nature and merits of my invention, what I claim is—

1. As an improvement in stem winding and setting attachments for watches, a collar which is adapted to receive and form a bearing for the outer end of a winding-pinion, and is locked in place by engagement with the adjacent parts, substantially as and for the purpose specified.

2. A collar which forms a bearing for the outer end of a winding-pinion, and is locked in place by engagement with a recess that is formed in one of the movement-plates, substantially as and for the purpose shown.

3. In combination with a winding-pinion, a bridge which is adapted to receive the same and to journal its inner end, and is secured to or upon one of the movement-plates, and a collar that operates to journal the outer end of said pinion, substantially as and for the purpose set forth.

4. A watch-movement in which are combined the following elements, to wit: a winding-bridge which is held in position upon the pillar-plate by a single screw, a winding-pinion having its inner end journaled within said bridge, and a collar that operates to journal the outer end of said pinion, and is contained within a recess which is partly formed in said bridge and in part within said pillar-plate, substantially as and for the purpose shown and described.

In testimony that I claim the foregoing I have hereunto set my hand this 27th day of August, 1884.

HERMAN A. T. REINECKE.

Witnesses:
W. T. WOODRUFF,
H. E. STOUGHTON.